(12) United States Patent
Koka et al.

(10) Patent No.: US 8,291,175 B2
(45) Date of Patent: Oct. 16, 2012

(54) PROCESSOR-BUS ATTACHED FLASH MAIN-MEMORY MODULE

(75) Inventors: Pranay Koka, Austin, TX (US);
Michael Oliver McCracken, Austin, TX (US); Herbert Dewitt Schwetman, Jr., Austin, TX (US); Jan Lodewijk Bonebakker, Amersfoort (NL)

(73) Assignee: Oracle America, Inc., Redwood City, CA (US)

( * ) Notice: Subject to any disclaimer, the term of this patent is extended or adjusted under 35 U.S.C. 154(b) by 448 days.

(21) Appl. No.: 12/581,073

(22) Filed: Oct. 16, 2009

(65) Prior Publication Data

US 2011/0093646 A1    Apr. 21, 2011

(51) Int. Cl.
*G06F 12/00*    (2006.01)
*G06F 13/00*    (2006.01)
*G06F 13/28*    (2006.01)

(52) U.S. Cl. ........................ 711/147; 711/130; 711/141

(58) Field of Classification Search .................. 711/130, 711/141, 147
See application file for complete search history.

(56) References Cited

U.S. PATENT DOCUMENTS

| | | | |
|---|---|---|---|
| 2002/0112132 A1* | 8/2002 | Lesmanne et al. | 711/141 |
| 2004/0088495 A1* | 5/2004 | Glasco et al. | 711/141 |
| 2008/0301373 A1* | 12/2008 | Harada et al. | 711/133 |
| 2009/0150619 A1* | 6/2009 | Hoogerbrugge | 711/146 |

* cited by examiner

*Primary Examiner* — Jared Rutz
*Assistant Examiner* — Ryan Bertram
(74) *Attorney, Agent, or Firm* — Osha Liang LLP

(57) ABSTRACT

A method for processing a read request identifying an address. The method includes receiving, at a module including a flash memory and a memory buffer, the read request from a requesting processor, mapping, using a coherence directory controller within the module, the address to a cache line in a cache memory associated with a remote processor, and sending a coherency message from the module to the remote processor to change a state of the cache line in the cache memory. The method further includes receiving, at the module, the cache line from the remote processor, sending, using processor bus and in response to the read request, the cache line to the requesting processor, identifying a requested page stored within the flash memory based on the address, storing a copy of the requested page in the memory buffer, and writing the cache line to the copy of the requested page.

20 Claims, 7 Drawing Sheets

PROCESSOR-BUS ATTACHED FLASH MAIN-MEMORY MODULE

BACKGROUND

As processors evolve, there is a need for memories which can accommodate the increasingly high performance requirements of the processors. Some common types of memories include a hard disk drive (HDD), a dynamic random access memory (DRAM), a static random access memory (SRAM), and a Flash memory. HDDs and flash memories are non-volatile (i.e., retain data when the power is removed), whereas DRAM and SRAM are volatile (i.e., do not retain data when the power is removed). A HDD is a magnetic memory with rotating media, whereas DRAM, SRAM, and FLASH are semiconductor memories. The other salient features of these memory types are following:

(a) HDD is a very cost effective memory, but HDD suffer from very long access latencies (e.g. of the order of milliseconds).
(b) DRAM has a good read and write performance. While DRAM does require a periodic refresh to retain data, the performance impact due to a refresh can be minimized in an optimized system design.
(c) SRAM is more expensive than DRAM, and is used when a very fast access performance is required.
(d) FLASH memory started with a NOR-FLASH architecture but has now evolved to a NAND-FLASH as the popular architecture. NAND-FLASH with MLC (multi level cell i.e. multiple bits/cell) provides an effective cell size about four times smaller than DRAM, and thus a significant cost advantage over DRAM. The FLASH can match DRAM in a read performance, while the FLASH write performance is slower than a DRAM.

System designers continue to explore ways to combine two or more memory types to meet the cost and performance requirements. However, existing memory solutions have not been able to meet the performance requirements of high bandwidth processors.

SUMMARY OF INVENTION

In general, in one aspect, the invention relates to a method for processing a read request identifying an address. The method comprises: receiving, at a module comprising a flash memory and a memory buffer, the read request from a requesting processor, wherein the read request is transmitted along a processor bus connecting the module and the requesting processor; mapping, using a coherence directory controller within the module, the address to a cache line in a cache memory associated with a remote processor, wherein the remote processor and the cache memory are external to the module; sending a coherency message from the module to the remote processor to change a state of the cache line in the cache memory; receiving, at the module, the cache line from the remote processor; sending, using the processor bus and in response to the read request, the cache line to the requesting processor; identifying a requested page stored within the flash memory based on the address; storing a copy of the requested page in the memory buffer; and writing the cache line to the copy of the requested page.

In general, in one aspect, the invention relates to a method for processing a write request identifying an address and having a data item. The method comprises: receiving, at a module comprising a flash memory and a memory buffer, the write request from a requesting processor, wherein the write request is transmitted along a processor bus connecting the module and the requesting processor; mapping, using a coherence directory controller within the module, the address to a cache line in a cache memory associated with a remote processor, wherein the remote processor and the cache memory are external to the module; sending a coherency message from the module to the remote processor to change a state of the cache line in the cache memory; identifying a requested page stored within the flash memory based on the address; storing a copy of the requested page in the memory buffer; and writing the data item to the copy of the requested page.

In general, in one aspect, the invention relates to a system for processing an access request identifying an address. The system comprises: a flash memory storing a plurality of pages including a requested page; a memory buffer configured to store a copy of the requested page after evicting an inactive page; a coherence directory controller (CDC) configured to map the address to a cache line in a cache memory associated with a remote processor, and send a coherence message to the remote processor to change a state of the cache line; a logic block operatively connected to the flash memory, the memory buffer, and the CDC, and configured to receive the access request from a requesting processor and identify the requested page based on the address, wherein the flash memory, the memory buffer, the CDC, and the logic block are within a module, wherein the requesting processor, the remote processor, and the cache memory are external to the module, and wherein the requesting processor is operatively connected to the module using a processor bus.

Other aspects of the invention will be apparent from the following description and the appended claims.

DETAILED DESCRIPTION

Figure 1:
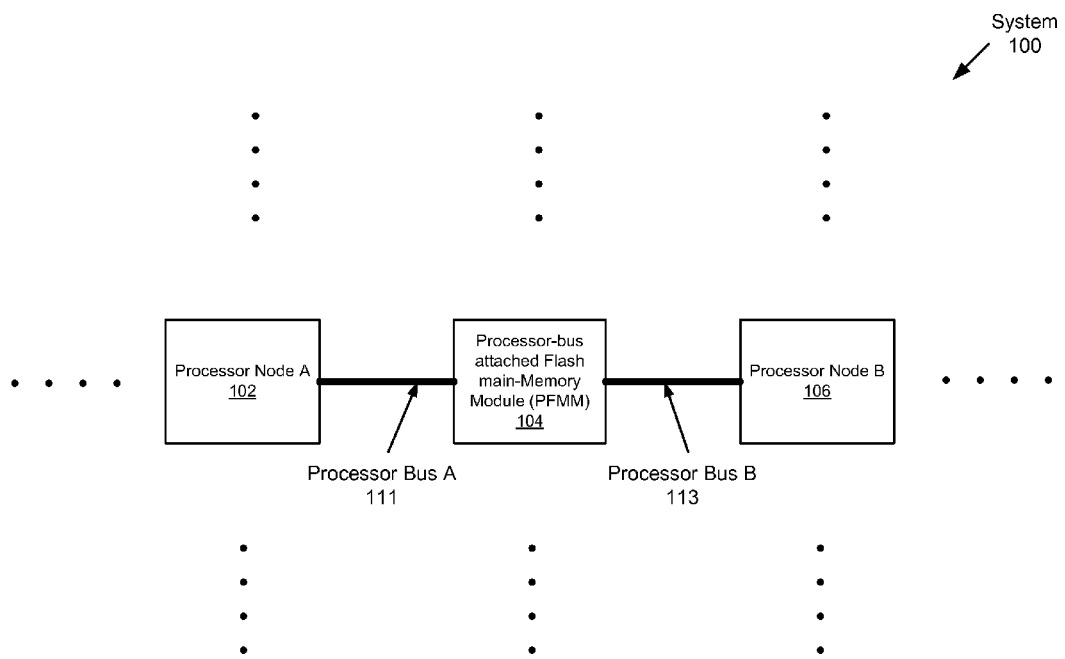
FIG. 1 shows a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The concept of a page and a cached page will be used while describing one or more embodiments of the invention. The page in a flash memory is typically the smallest granularity of data for a read operation and a write (i.e., erase/program) operation. The erase is typically done on a global level in the whole page. In other words, all the bits in the page are set to a logic "1" state by an erase operation. The erase is commonly followed with a program operation, which modifies some of the bits from the logic "1" state to the logic "0" state while leaving other bits unchanged at the logic "1" state. The page is the smallest granularity block size for transferring data between two memories. A page of data in a flash memory may be referred to as a flash page.

A typical flash memory cell wears out after 10,000 to 1M write cycles, which is commonly referred to as an endurance. Wear leveling algorithms may mask and/or minimize limitations of the flash memory including the wear out of cells. The wear leveling algorithms use one or more of these features: the error detection and correction, moving data to lesser used blocks in the flash memory array, and having spare blocks for later replacement. Most of the flash controllers implement some kind of wear leveling algorithm, and such algorithms extend the effective life of a flash memory much beyond the intrinsic memory cell endurance.

Cache coherency is necessary when multiple processors are coupled, directly or indirectly, to a shared memory (e.g., main memory). The processors have caches which store copies of the same block of data from the shared memory. A processor may read from and write to the copy stored within the processor's cache. However, any modification to the copy made by the processor is local to the processor. In other words, following the modification to the copy, the copy is no longer a true copy (i.e., exact copy) of the corresponding block in the shared memory. Moreover, the other processors are unaware of the modification. Accordingly, the various "copies" of the block are inconsistent following the modification. A cache coherency protocol may be used to resolve the inconsistent copies. Examples of cache coherency protocols include the modified, shared, invalid (MSI) protocol; the modified, owned, shared, invalid (MOSI) protocol; the modified, exclusive, shared, invalid (MESI) protocol; the modified, owned, exclusive, shared, invalid (MOESI) protocol, etc. In general, cache coherency protocols resolve inconsistent data by assigning a state (e.g., modified, exclusive, owned, shared, invalid, etc.) to each cache line within a cache memory, and changing the state by sending a coherency message to the cache memory or corresponding processor having the cache memory.

FIG. 1 shows a system (100) in accordance with one or more embodiments of the invention. Those skilled in the art, having the benefit of this detailed description, will appreciate that the components shown in FIG. 1 may differ among embodiments of the invention, and that one or more of the components may be optional. Further, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a processor node A (102), a processor node B (106), and a Processor-bus attached Flash main-Memory Module (PFMM) (104). The PFMM (104) may also be referred to as a module. As shown in FIG. 1, the processor node A (102) and the processor node B (106) are external to the module (i.e., the PFMM (104)). The PFMM (104) is coupled to the processor node A (102) by a processor bus A (111) and the PFMM (104) is coupled to the processor node B (106) by a processor bus B (113).

The dotted lines in FIG. 1 represent additional processor nodes and additional PFMM nodes. In one or more embodiments of the invention, multiple processor nodes are coupled to a PFMM, either directly or indirectly, via one or more processor buses. Furthermore, in one or more embodiments of the invention, a single processor node is coupled to multiple PFMM nodes.

In one or more embodiments, a processor bus A (111) and a processor bus B (113) may be a point-to-point link using a standard protocol. The standard protocol may be, for example, the QuickPath Interconnect (QPI) protocol, the HyperTransport (HT) protocol, or some other protocol. The communication protocol on the processor bus is specific to the bus (or, the point-to-point link), and may be implemented in hardware, software, or combination thereof.

In one or more embodiments of the invention, a processor node (i.e., the processor node A (102), the processor node B (106)) issues access requests (i.e., read requests and/or write requests) to the PFMM (104). In response to a read request, the PFMM (104) returns a cache line to the requesting processor. In the case of a write request, the write request includes a data item (e.g., cache line or a portion of a cache line) for storage within the PFMM (104).

Figure 2:
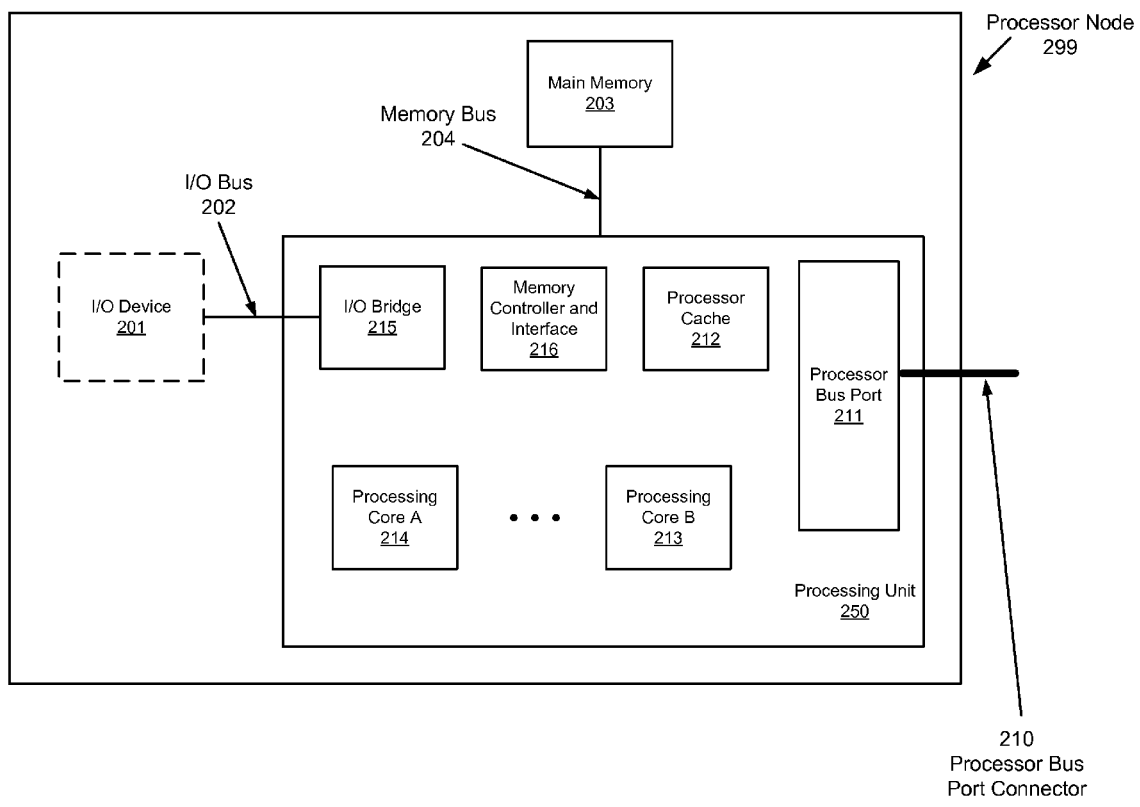
FIG. 2 shows a processor node in accordance with one or more embodiments of the invention.

FIG. 2 shows a processor node (299) in accordance with one or more embodiments of the invention. Those skilled in the art, having the benefit of this detailed description, will appreciate that the components shown in FIG. 2 may differ among embodiments of the invention, and that one or more of the components may be optional. Further, one or more of the components shown in FIG. 2 may be omitted, repeated, supplemented, and/or otherwise modified from that shown in FIG. 2. Accordingly, the specific arrangement of components shown in FIG. 2 should not be construed as limiting the scope of the invention.

The processor node (299) shown in FIG. 2 is essentially the same as the processor node A (102) and the processor node B (106) (discussed above in reference to FIG. 1). The processor node (299) includes a processing unit (250), an I/O bus (202) coupled to the processing unit (250), a main memory (203) coupled to the processing unit (250) via a memory bus (204), and a processor bus port connector (210). In one or more embodiments, the I/O bus (202) may be connected to an I/O device (201). The processing unit (250) further includes a processing core A (214), a processing core B (213), a processor cache (212), a memory controller and interface (216), an I/O bridge (215), and a processor bus port (211). In one or more embodiments of this invention, the processing unit (250) only includes one processing core.

In one or more embodiments of the invention, data that is frequently accessed in the main memory (203) may be stored in the processor cache (212). The access time of the processor cache (212) is faster than the access time of the main memory (203). In one or more embodiments of this invention, the processor cache (212) is implemented with a very high speed SRAM.

The processor bus port connector (210) is used to connect the processor node (299) with a processor bus (e.g., the processor bus A (111) or the processor bus B (113), discussed above in reference to FIG. 1). The memory controller and interface (216) controls the operation of the main memory (203) via the memory bus (204). The I/O bus (202) interfaces with the I/O device (201), such as a hard disk (HDD), a solid state drive (SDD), a networking device, and other peripheral devices.

Figure 3:
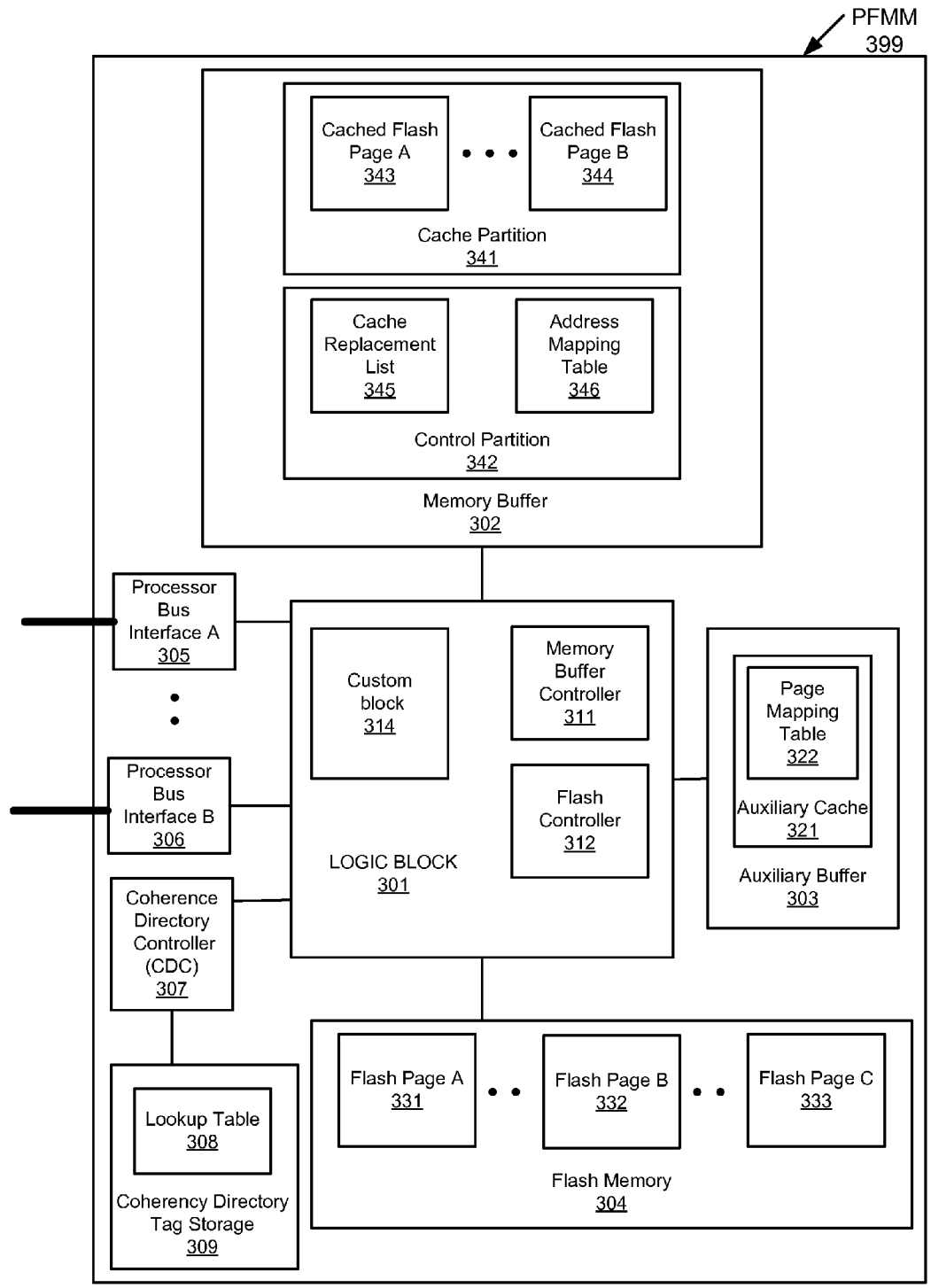
FIG. 3 shows a PFMM in accordance with one or more embodiments of the invention.

FIG. 3 depicts a block diagram of the PFMM (399) in accordance with one or more embodiments of the invention. As discussed above, the PFMM (399) may be referred to as a module. Further, the PFMM (399) may be essentially the same as the PFMM (104), discussed above in reference to FIG. 1. Those skilled in the art, having the benefit of this detailed description, will appreciate that the components shown in FIG. 3 may differ among embodiments of the invention, and that one or more of the components may be optional. Further, one or more of the components shown in FIG. 3 may be omitted, repeated, supplemented, and/or otherwise modified from that shown in FIG. 3. Accordingly, the specific arrangement of components shown in FIG. 3 should not be construed as limiting the scope of the invention.

As shown in FIG. 3, the PFMM (399) includes a logic block (301), a flash memory (304), a memory buffer (302), an auxiliary buffer (303), a coherence directory controller (CDC) (307), a coherence directory tag storage (309), a processor bus interface A (305), and a processor bus interface B (306). The memory buffer (302) may be implemented using DRAM. In one or more embodiments of this invention, the PFMM (399) has only one processor bus interface, such as a processor bus interface A (305).

The logic block (301) includes a custom block (314), a memory buffer controller (311), and a flash controller (312). The memory buffer controller (311) controls the operation of the memory buffer (302) and the flash controller (312) controls the operation of the flash memory (304). In one or more embodiments of this invention, the custom block (314) is an application specific integrated circuit (ASIC). In one or more embodiments of the invention, the flash controller (312) executes a wear leveling algorithm to mask/overcome limitations of the flash memory (304). The memory controller (311) interfaces with the memory buffer (302) and the flash controller (312) interfaces with the flash memory (304).

The flash memory (304) has multiple flash pages including a flash page A (331), a flash page B (332), and a flash page C (333). The page in a flash memory is typically the smallest granularity of data for a read operation and a write operation. The page size can be 512 bytes, 1000 bytes, 4000 bytes, or a different size, depending on the underlying design and technology of the flash memory (304). Each flash page may include multiple cache lines. Accordingly, multiple physical addresses, each corresponding to a different cache line, may map to a single flash page. In other words, each of the multiple physical addresses may identify the same flash page.

Copies of the more recently accessed flash pages are stored in the memory buffer (302). For example, the cached flash page A (343) is a copy of the flash page A (331) and cached flash page B (344) is a copy of the flash page B (332). The flash page C (333) does not have a corresponding cached flash page, since the flash page C (333) might not have been recently accessed. In one or more embodiments, data in the cached flash page A (343) and/or data in the cached flash page B (344) may be later modified such that it is no longer a true copy (i.e., exact copy) of data in the flash page A (331) and/or the flash page B (332).

As shown in FIG. 3, the cached flash page A (343) and the cached flash page B (344) are part of a cache partition (341) in the memory buffer (302). The control partition (342) in the memory buffer (302) includes a cache replacement list (345) and an address mapping table (346). The cache replacement list (345) tracks usage of pages stored in the memory buffer (302). Accordingly, the cache replacement list (345) may be accessed to determine which page within the memory buffer (302) is the most frequently accessed, and which page within the memory buffer (302) is the least frequently accessed. The least frequently accessed page within the memory buffer (302), or a page with a low access frequency, may be deemed an inactive page.

In one or more embodiments of the invention, the cache replacement list (345) also includes information as to which of the cached flash pages in the memory buffer (302) are modified (i.e., no longer true copies of their corresponding pages in the flash memory (304)). In one or more embodiments of the invention, the address mapping table (346) stores information for mapping a physical address (e.g., an address corresponding to a cache line) to a page in the flash memory (304) and/or the memory buffer (302).

The auxiliary buffer (303) includes an auxiliary cache (321). The information in the control partition (342) (i.e., the cache replacement list (345) and the address mapping table (346)), may be replicated (i.e., cached) in the page mapping table (322) in the auxiliary cache (321). As discussed above, the information in the control partition (342) includes a listing of flash pages copied into the cache partition (341), a listing of the pages in the cache partition (341) that are subsequently modified, and the address mapping information in the address mapping table (346). The information of the control partition (342) may be replicated in the auxiliary buffer (303) to allow for a faster access (i.e., the auxiliary buffer (303) has faster access times than the memory buffer (302)). In one or more embodiments of the invention, the information in the control partition (342) (i.e., the cache replacement list (345) and the address mapping table (346)), is stored directly in the page mapping table (322), instead of copying the information from the control partition (342) to the page mapping table.

In one or more embodiments of the invention, a read request and/or a write request identifying a physical address is sent to the logic block (301). As discussed above, a read request and/or a write request may be referred to as an access request. As also discussed above, the physical address corresponds to a cache line. In the case of a read request, the physical address corresponds to a cache line requested by a requesting processor. In the case of a write request from a requesting processor, the physical address corresponds to a cache line for storing (i.e., writing) data provided by the requesting processor. The custom block (314) in the logic block (301) identifies the page corresponding to the physical address (i.e., the page having the cache line). The page corresponding to the physical address may be referred to as the requested page.

In one or more embodiments of the invention, the page mapping table (322) is accessed to determine if the requested page is resident in the cache partition (341). Alternatively, the control partition (342) in the memory buffer (302) may be accessed to determine if the copy of the requested page is resident in the cache partition (341). In a read request, a cache line is retrieved from the cache partition (341) if the requested page is resident (i.e., stored) in the cache partition. Otherwise, the cache line is retrieved from the flash memory (304) because the requested page is not in the cache partition (341). In a write request, a cache line or portion of a cache line provided by the requesting processor is stored in the requested page in the memory buffer (302). At a future time, the requested page, now modified with the cache line provided by the requesting processor, is stored in the flash memory (304).

Further, during the processing of a read request and/or a write request, an inactive page stored in the cache partition (341) may be evicted and replaced as per a cache eviction policy. For example, if the cache eviction policy is a least recently used (LRU) page eviction policy, the LRU page within the cache partition (341) is deemed the inactive page and subsequently evicted from the cache partition (341), when storage space is needed. When the evicted inactive page is an exact copy of a page in the flash memory (304), the evicted inactive page may be discarded. However, when the evicted inactive page is not a true copy of a page in the flash memory (304) (i.e., the inactive page has modified data), the evicted inactive page is subsequently written to the flash memory (304). The information regarding whether the evicted inactive page has been modified is accessed from the page mapping table (322). Alternatively, the information regarding whether the evicted inactive page has been modified is accessed from the control partition (342) in the memory buffer (302).

As discussed above, the PFMM (399) in FIG. 3 also includes the CDC (307) and a coherency directory tag storage (309). In one or more embodiments of the invention, the coherency directory tag storage (309) may be part of the CDC (307). The coherency directory tag storage (309) records (i.e., tags) cache lines in use by remote processors operatively connected to the PFMM (399). Further, the coherency directory tag storage (309) may record/track the state of a cache line in the cache memory of a remote processor. In one or more embodiments of the invention, the coherency directory tag storage (309) is implemented using a lookup table (308). In alternate embodiments of the invention, the lookup table (308) may be part of the auxiliary buffer (303).

In one or more embodiments of the invention, the CDC (307) is configured to send coherency messages to one or more remote processors. As discussed above, the coherency messages include, for example, a write-back instruction, a downgrade instruction, an invalidate instruction, and an acknowledgment etc. The communication between the processor(s) and the CDC (307) may take place via the custom block (314) in the logic block (301). In one or more embodiments of this invention, the CDC (307) may be part of the custom block (314).

The PFMM (399) in FIG. 3 also includes a processor bus interface A (305) and a processor bus interface B (306). The PFMM (399) is coupled to processor buses (e.g., the processor bus A (111) and the processor bus B (113), discussed above in reference to FIG. 1). In one or more embodiments of this invention, the PFMM (399) may only have one processor bus interface. Thus, the PFMM (399) can be coupled to one or more processor nodes.

Figure 4A:
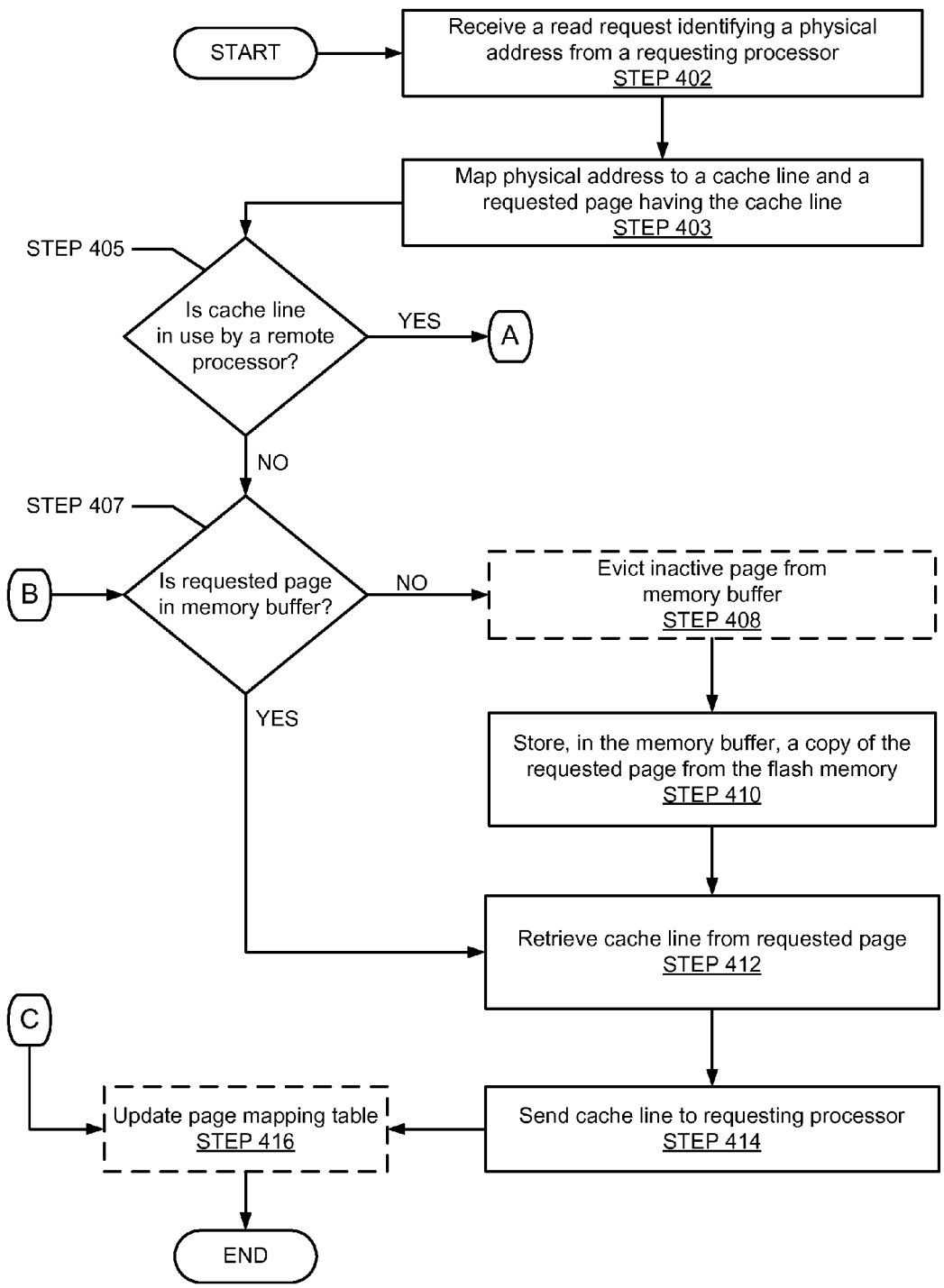
FIGS. 4A and 4B show flowcharts for processing a read request in accordance with one or more embodiments of the invention.
Figure 4B:
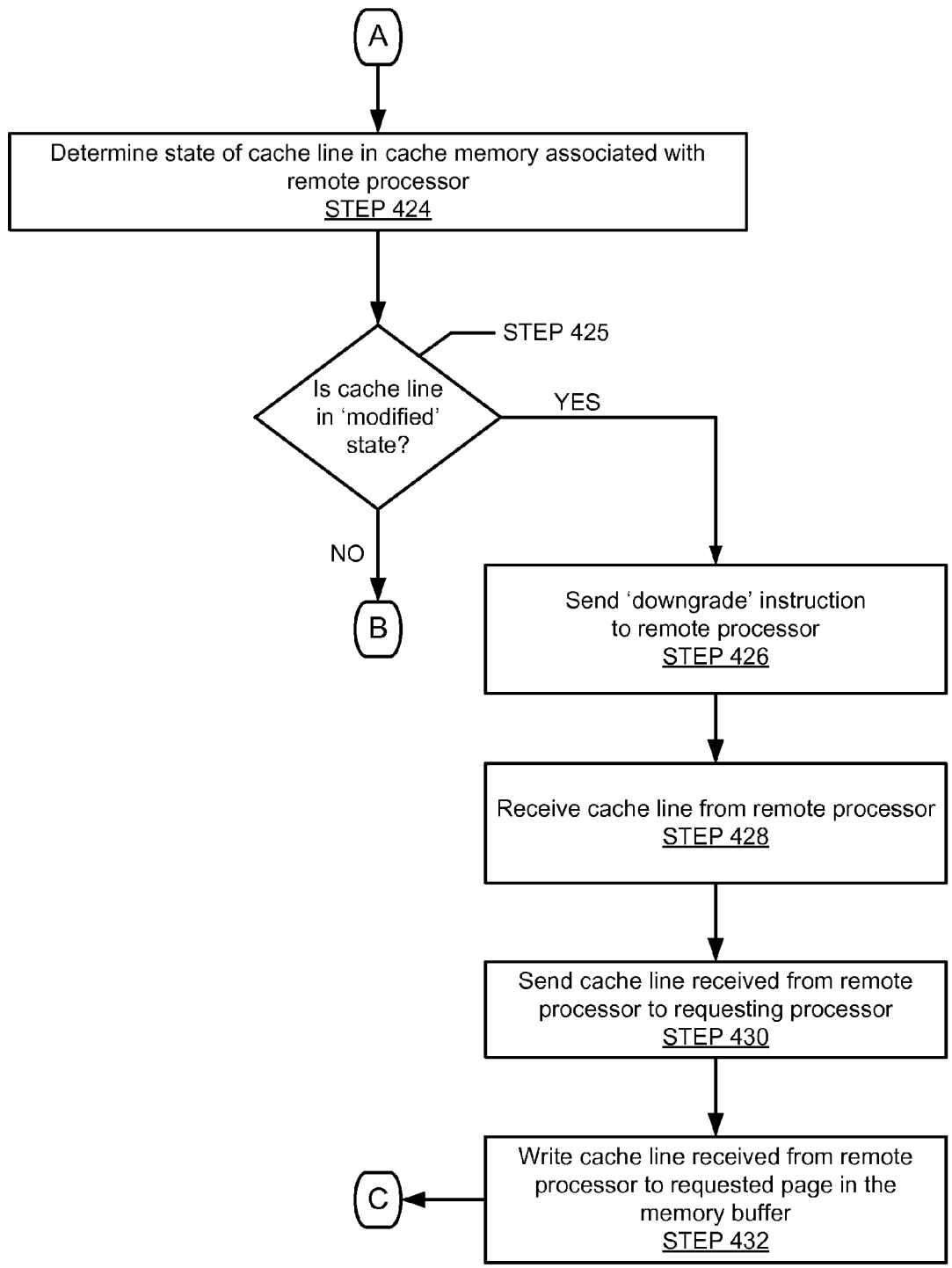

FIGS. 4A and 4B show flowcharts for processing a read request in accordance with one or more embodiments of the invention. One or more of the steps shown in FIGS. 4A and 4B may be omitted, repeated, and/or performed in a different order. Accordingly, embodiments of the invention should not be considered limited to the specific arrangements of steps shown in FIGS. 4A and 4B. Further, the process depicted in FIGS. 4A and 4B may be implemented using the system (100), discussed above in reference to FIGS. 1-3.

Initially, a read request identifying a physical address is received from a requesting processor (STEP 402). The read request may be received by a module (e.g., the PFMM (104)), discussed above in reference to FIG. 1) using a processor bus operatively connecting the module and the requesting processor.

In STEP 403, the physical address is mapped to a cache line and a requested page having the cache line. As discussed above, the physical address corresponds to a cache line and the requested page has the cache line. In one or more embodiments of the invention, the requested page is identified from the address mapping table (346), discussed above in reference to FIG. 3. Specifically, the address mapping table (346) may output the identification of the requested page in response to an input including the physical address.

In STEP 405, it is determined whether the cache line is in use by a remote processor. In other words, it is determined whether a copy of the cache line is stored in a cache memory of a remote processor (i.e., a processor other than the requesting processor). As discussed above, the coherency directory tag storage (309) records/tracks cache lines being used by remote processors and the state of the cache lines in the cache memories of the remote processors. Accordingly, in one or more embodiments of the invention, the coherency directory tag storage (309) is accessed to determine whether the cache line is in use by a remote processor. When it is determined that the cache line is in use by a remote processor, the process proceeds to portal "A", corresponding to FIG. 4B (discussed below). When it is determined that the cache line is not in use by a remote processor, the process proceeds to STEP 407.

In STEP 407, it is determined whether the requested page is in the memory buffer (i.e., memory buffer (302)). As discussed above, the page mapping table (322) and/or the address mapping table (346) tracks/records the locations of pages within the module (e.g., flash memory, flash memory and memory buffer, etc.). In one or more embodiments of the invention, the page mapping table (322) and/or the address mapping table (346) is accessed to determine whether the requested page is in the memory buffer. When it is determined that the requested page is in the memory buffer, the process proceeds to STEP 412. When it is determined that the requested page is not in the memory buffer, the process proceeds to STEP 408.

In STEP 408, an inactive page is evicted from the memory buffer. As discussed above, the cache replacement list (345) records/tracks usage of pages in the memory buffer. As also discussed above, the least frequently accessed/used page or a page accessed with a low frequency is deemed the inactive page. As discussed above, similar information may be replicated in the page mapping table (322). In one or more embodiments of the invention, the cache replacement list (345) and/or the page mapping table (322) are accessed to identify the inactive page.

When the inactive page is an exact copy of a page in the flash memory (304), the evicted inactive page may be discarded. Alternatively, when the inactive page is not an exact copy of a page in the flash memory (304) (i.e., the inactive page was modified), the evicted inactive page is written to the flash memory (304), replacing the outdated version of the page in the flash memory. The existence of modifications to the evicted inactive page may also be recorded/tracked by the page mapping table (322) and/or the cache replacement list (345).

Those skilled in the art, having the benefit of this detailed description, will appreciate that STEP 408 is optional when the memory buffer has space to store an additional page (i.e., the memory buffer is not at maximum capacity).

In STEP 410, the requested page is retrieved from the flash memory and stored in the memory buffer. The requested page may take the place of the evicted inactive page (STEP 408) within the memory buffer. In STEP 412, the cache line is retrieved from the requested page. If STEP 412 is executed immediately following STEP 407, the cache line is retrieved from the requested page from within the memory buffer. However, if STEP 412 is executed immediate after STEP 410, the cache line may be retrieved from the requested page as a copy of the requested page is being stored in the memory buffer.

In STEP 414, the cache line is sent from the module to the request requesting processor. In one or more embodiments of the invention, the cache line is sent using the processor bus connecting the requesting processor and the module.

As discussed above, the page mapping table (322) and/or the control partition (342) (i.e., the cache replacement list (345) and the address mapping table (346)) may track the pages stored in the memory buffer, the pages in the memory buffer that are modified, and the number of times each page in the memory buffer is accessed (i.e., access frequency).

Accordingly, in STEP 416, the page mapping table (322) and/or the control partition (342) (i.e., the cache replacement list (345) and the address mapping table (346)) may be updated to (i) reflect the existence of the copy of the flash page in the memory buffer (i.e., in response to STEP 410); (ii) reflect the access frequency of a page within the memory buffer (i.e., in response to STEP 410 immediately following STEP 407); and/or (iii) identify the pages in the memory buffer that are modified (i.e., in response to STEP 432 (discussed below)).

As discussed above, FIG. 4B shows a flowchart for processing a read request in accordance with one or more embodiments of the invention. Specifically, the process shown in FIG. 4B is invoked after determining the cache line is in use by a remote processor (STEP 405, discussed above in reference to FIG. 4A). Although the process shown in FIG. 4B includes cache line states (e.g., "modified" in STEP 425) and coherency messages (e.g., "downgrade instruction" in STEP 426) that are associated with a specific cache-coherency protocol, those skilled in the art, having the benefit of this detailed description, will appreciate that cache inconsistencies may be resolved using any cache-coherency protocol. Accordingly, the steps, the specific cache line states, and the coherence messages mentioned in FIG. 4B are only an example of the cache coherency protocol that can be executed to resolve cache inconsistencies.

Initially, the state of the cache line in the cache memory associated with the remote processor is determined (STEP 424). As discussed above, the coherency directory tag storage (309) records/tracks the state of a cache line stored in the remote cache memory. Accordingly, in one or more embodiments of the invention, the coherency directory tag storage (309) is accessed to determine the state of the cache line in the remote cache memory.

In STEP 425, it is determined whether the cache line in the remote processor's cache memory is in a "modified" state. In other words, it is determined whether the remote processor has written to (i.e., modified) the portion of its cache memory including the cache line. When it is determined that the cache line is in a "modified" state, the processor proceeds to STEP 426. Otherwise, when it is determined that the cache line is not in a "modified" state (e.g., the remote processor read from but did not write to the portion of its cache memory including the cache line), the process proceeds to portal B, which returns the process to FIG. 4A.

In STEP 426, a "downgrade" instruction is sent from the module to the remote processor. As discussed above, the downgrade instruction is an example of a coherency message. The "downgrade" instruction changes the state of the cache line from "modified" to a different state (e.g., "shared", "invalid", etc.). Further, the coherency directory tag storage (309) is updated to reflect the change in state. In STEP 428, the modified cache line is sent from the remote processor to the module. In STEP 430, the received cache line is forwarded from the module to the requesting processor (e.g., using a processor bus connecting the requesting processor and the module).

In STEP 432, the received cache line is written to the requested page in the memory buffer. Depending on the cache coherency protocol in use, STEP 428 and STEP 432 may be referred to as a "write-back" operation. Moreover, the "write-back" operation may be essentially the same as a write operation, discussed below in reference to FIG. 5. After completion of STEP 432, the process proceeds to portal C, which returns the process to FIG. 4A.

Figure 5:
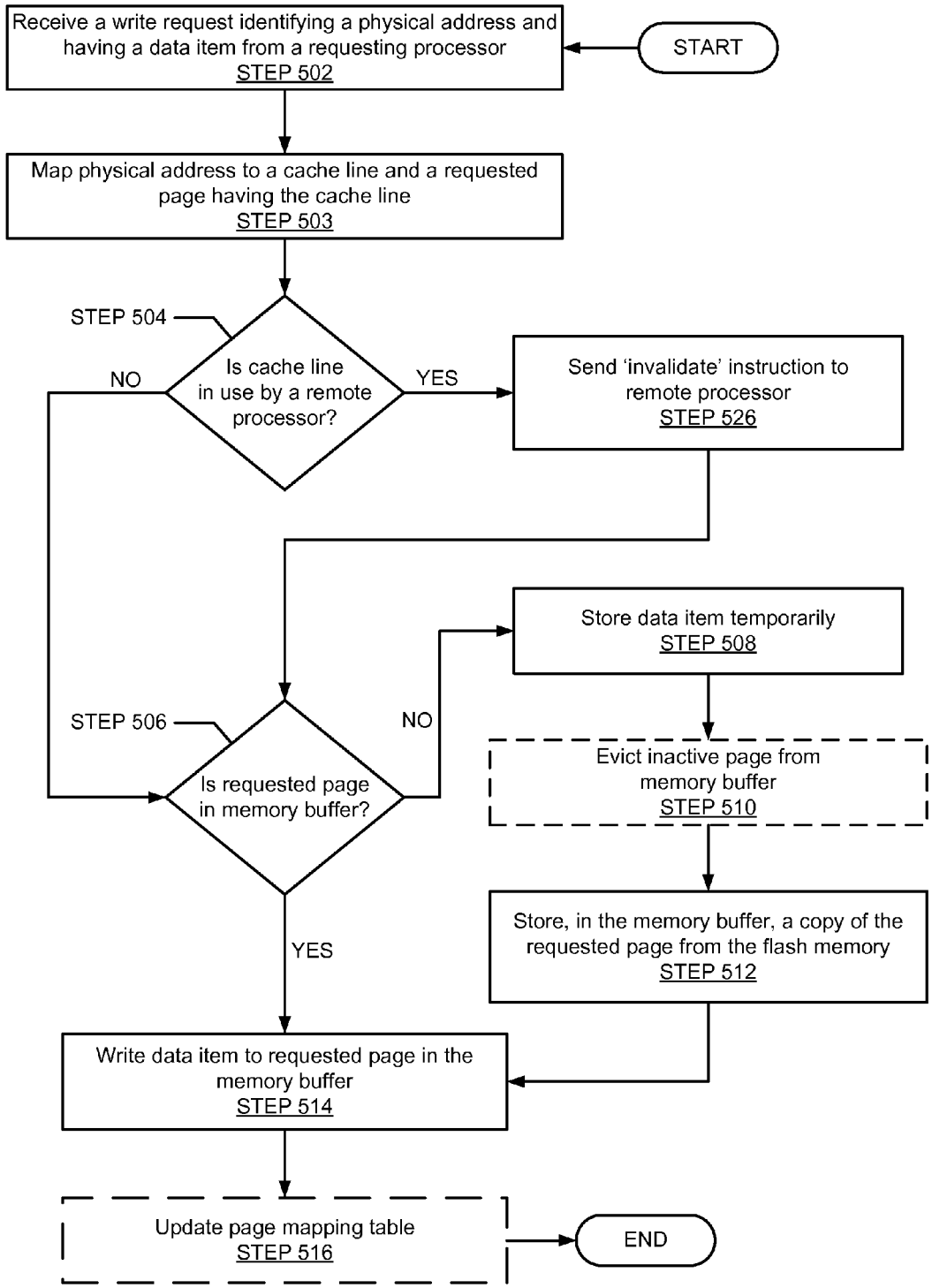
FIG. 5 shows a flowchart for processing a write request in accordance with one or more embodiments of the invention.

FIG. 5 shows a flowchart for the processing of a write request. In one or more embodiments of the invention, one or more of the steps shown in FIG. 5 may be omitted, repeated, and/or performed in a different order. Accordingly, embodiments of the invention should not be considered limited to the specific arrangements of steps shown in FIG. 5. Further, the process shown in FIG. 5 may be implemented using the system (100), discussed above in reference to FIGS. 1-3.

Initially, a write request identifying a physical address and having a data item is received from a requesting processor (STEP 502). The write request may be received by a module (e.g., the PFMM (104), discussed above in reference to FIG. 1) using a processor bus operatively connecting the module and the requesting processor.

In STEP 503, the physical address is mapped to a cache line and a requested page having the cache line. As discussed above, the physical address corresponds to a cache line and the requested page has the cache line. In one or more embodiments of the invention, the requested page is identified from the address mapping table (346), discussed above in reference to FIG. 3. Specifically, the address mapping table (346) may output the identification of the requested page in response to an input including the physical address.

In STEP 504, it is determined whether the cache line is in use by a remote processor. In other words, it is determined whether a copy of the cache line is stored in a cache memory of a remote processor (i.e., a processor other than the requesting processor). As discussed above, the coherency directory tag storage (309) records/tracks cache lines being used by remote processors and the state of the cache lines in the cache memories of the remote processors. Accordingly, in one or more embodiments of the invention, the coherency directory tag storage (309) is accessed to determine whether the cache line is in use by a remote processor. When it is determined that the cache line is in use by a remote processor, the process proceeds to STEP 526. When it is determined that the cache line is not in use by a remote processor, the process proceeds to STEP 506.

In STEP 526, an "invalidate" instruction is sent from the module to the remote processor. As discussed above, the "invalidate" instruction is an example of a coherency message. The "invalidate" instruction changes the state of the cache line in the remote cache memory to an "invalid" state (i.e., the remote cache memory does not have the correct/latest version of the cache line). Further, the coherency directory tag storage (309) is updated to reflect the change in the state of the cache line.

In STEP 506, it is determined whether the requested page is in the memory buffer (i.e., memory buffer (302)). As discussed above, the page mapping table (322) and/or the address mapping table (346) tracks/records the locations of pages within the module (e.g., flash memory, flash memory and memory buffer, etc.). In one or more embodiments of the invention, the page mapping table (322) and/or the address mapping table (346) is accessed to determine whether the requested page is in the memory buffer. When it is determined that the requested page is in the memory buffer, the process proceeds to STEP 514. When it is determined that the requested page is not in the memory buffer, the process proceeds to STEP 508.

In STEP 508, the received data item is placed in temporary storage. The temporary storage may be located within the memory buffer (302). Alternatively, the temporary storage may be located within the auxiliary buffer (303). After the data item is placed in temporary storage, an acknowledgment is sent to the requesting processor.

In STEP 510, an inactive page is evicted from the memory buffer. As discussed above, the cache replacement list (345) records/tracks usage of pages in the memory buffer. As also discussed above, the least frequently accessed/used page or a page accessed with a low frequency is deemed the inactive page. As discussed above, similar information may be replicated in the page mapping table (322). In one or more embodiments of the invention, the cache replacement list (345) and/or the page mapping table (322) are accessed to identify the inactive page.

When the inactive page is an exact copy of a page in the flash memory (304), the evicted inactive page may be discarded. Alternatively, when the inactive page is not an exact copy of a page in the flash memory (304) (i.e., the inactive page was modified), the evicted inactive page is written to the flash memory (304), replacing the outdated version of the page in the flash memory. The existence of modifications to the evicted inactive page may also be recorded/tracked by the page mapping table (322) and/or the cache replacement list (345).

Those skilled in the art, having the benefit of this detailed description, will appreciate that STEP 510 is optional when the memory buffer has space to store an additional page (i.e., the memory buffer is not at maximum capacity).

In STEP 512, the requested page is retrieved from the flash memory and stored in the memory buffer. The requested page may take the place of the evicted inactive page (STEP 510) within the memory buffer. In STEP 514, the data item received from the requesting processor is written to the requested page in the memory buffer. If STEP 514 is executed immediately following STEP 512, the data item is written from temporary storage to the requested page.

As discussed above, the page mapping table (322) and/or the control partition (342) (i.e., the cache replacement list (345) and the address mapping table (346)) tracks/records the pages stored in the memory buffer, the pages in the memory buffer that are modified, and the number of times each page in the memory buffer is accessed (i.e., access frequency). Accordingly, in STEP 516, the page mapping table (322) and/or control partition (342) (i.e., the cache replacement list (345) and the address mapping table (346)) may be updated to (i) reflect the existence of the copy of the flash page in the memory buffer (i.e., in response to STEP 512); and/or (ii) reflect the access frequency of a page within the memory buffer (i.e., in response to STEP 514 immediately following STEP 506).

Figure 6:
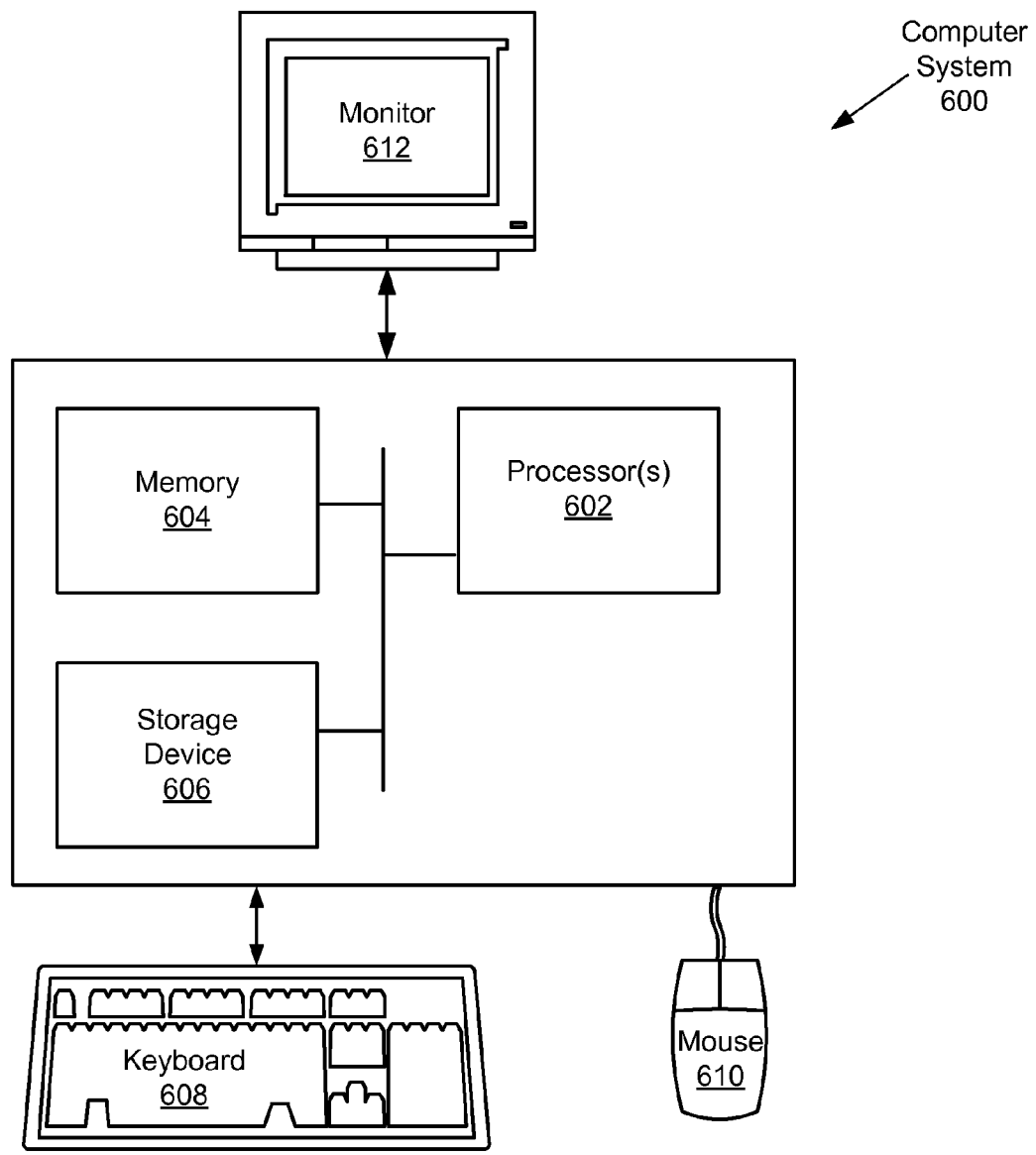
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random document access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a tangible computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a read request identifying an address, comprising:
  receiving, at a module comprising a flash memory and a memory buffer, the read request from a requesting processor node,
    wherein the requesting processor node comprises a first processor, a first main memory, and a first cache memory,
    wherein the address identified by the read request corresponds to a cache line stored on the module,
    and wherein the read request is transmitted along a processor bus connecting the module and the requesting processor node;
  determining, using a coherence directory controller within the module, that a copy of the cache line is stored in a second cache memory in a remote processor node,
    wherein the remote processor node comprises the second cache memory and a second main memory, and
    wherein the remote processor node is external to the module;
  sending a coherency message from the module to the remote processor node to change a state of the copy of the cache line in the second cache memory;
  receiving, at the module, the copy of the cache line from the remote processor node;
  sending, using the processor bus and in response to the read request, the cache line to the requesting processor node;
  identifying a requested page stored within the flash memory of the module based on the address;
  storing a copy of the requested page in the memory buffer of the module; and
  writing the cache line to the copy of the requested page in the memory buffer of the module.

2. The method claim 1, wherein the coherency message is a downgrade instruction.

3. The method of claim 1, wherein the copy of the cache line from the remote processor node is received at the module as part of a write-back operation.

4. The method of claim 1, further comprising:
evicting an inactive page from the memory buffer before storing the copy of the requested page in the memory buffer.

5. The method of claim 4, further comprising:
storing the inactive page in the flash memory after evicting the inactive page from the memory buffer.

6. The method of claim 4, further comprising:
accessing, prior to evicting the inactive page, a cache replacement list within the module to identify the inactive page,
wherein the memory buffer implements a least recently used (LRU) page eviction policy.

7. The method of claim 1, further comprising:
accessing, in response to receiving the read request, a table selected from a group consisting of a page mapping table and an address mapping table within the module to identify a location of the requested page within the module; and
updating the table in response to storing the copy of the requested page in the memory buffer.

8. The method of claim 1, further comprising:
replacing the requested page in the flash memory with the copy of the requested page after writing the cache line to the copy of the requested page.

9. A method for processing a write request identifying an address and having a data item, the method comprising:
receiving, at a module comprising a flash memory and a memory buffer, the write request from a requesting processor node,
wherein the requesting processor node comprises a first processor, a first main memory, and a first cache memory,
wherein the address identified by the write request corresponds to a cache line stored on the module, and
wherein the write request is transmitted along a processor bus connecting the module and the requesting processor;
determining, using a coherence directory controller within the module, that a copy of the cache line is stored in a second cache memory in a remote processor node,
wherein the remote processor node comprises the second cache memory and a second main memory, and
wherein the remote processor node is external to the module;
sending a coherency message from the module to the remote processor node to change a state of the copy of the cache line in the second cache memory;
identifying a requested page stored within the flash memory of the module based on the address;
storing a copy of the requested page in the memory buffer of the module; and
writing the data item to the copy of the requested page in the memory buffer of the module.

10. The method claim 9, wherein the coherency message is an invalidate instruction.

11. The method of claim 9, further comprising:
evicting an inactive page from the memory buffer before storing the copy of the requested page in the memory buffer.

12. The method of claim 11, further comprising:
storing the inactive page to the flash memory after evicting the inactive page from the memory buffer.

13. The method of claim 11, further comprising:
accessing, prior to evicting the inactive page, a cache replacement list within the module to identify the inactive page,
wherein the memory buffer implements a least recently used (LRU) page eviction policy.

14. The method of claim 9, further comprising:
accessing, in response to receiving the write request, a page mapping table within the module to identify a location of the requested page within the module; and
updating the page mapping table in response to storing the copy of the requested page in the memory buffer.

15. A system for processing an access request identifying an address, comprising:
a flash memory storing a plurality of pages including a requested page, wherein the address corresponds to a cache line in the requested page;
a memory buffer configured to store a copy of the requested page after evicting an inactive page;
a coherence directory controller (CDC) configured to:
determine that a copy of the cache line is stored in a cache memory in a remote processor node, wherein the remote processor node comprises the cache memory and a main memory, and
send a coherence message to the remote processor node to change a state of the copy of the cache line;
a logic block operatively connected to the flash memory, the memory buffer, and the CDC, and configured to:
receive the access request from a requesting processor node, and
identify the requested page based on the address,
wherein the flash memory, the memory buffer, the CDC, and the logic block are within a module,
wherein the requesting processor node, the remote processor node, and the cache memory are external to the module, and
wherein the requesting processor node is operatively connected to the module using a processor bus.

16. The system of claim 15, wherein the memory buffer comprises:
a cache replacement list configured to identify the inactive page, wherein the memory buffer implements a least recently used (LRU) page eviction policy.

17. The system of claim 15, wherein the access request is a read request and the logic block is further configured to receive the cache line from the remote processor, send the cache line to the requesting processor node using the processor bus, and write the cache line to the copy of the requested page in the memory buffer.

18. The system of claim 15, wherein the access request is a write request comprising a data item, and wherein the logic block is further configured to write the data item to the copy of the requested page in the memory buffer.

19. The system of claim 15, further comprising:
an address mapping table, within the memory buffer, configured to map the address to the requested page; and
a cache replacement list, within the memory buffer, recording at least an access frequency of the inactive page.

20. The system of claim 19, further comprising:
a page mapping table configured to cache the address mapping table and the cache replacement list.

* * * * *